(12) United States Patent
Chen et al.

(10) Patent No.: US 6,786,411 B2
(45) Date of Patent: Sep. 7, 2004

(54) IMAGE SENSOR ARRAY READOUT FOR SIMPLIFIED IMAGE COMPRESSION

(75) Inventors: Zhiliang Julian Chen, Plano, TX (US); Steven Derrick Clynes, Allen, TX (US); Xiaochuan Guo, Gainesville, FL (US); Anli Liu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 584 days.

(21) Appl. No.: 09/750,400

(22) Filed: Dec. 28, 2000

(65) Prior Publication Data

US 2002/0085107 A1 Jul. 4, 2002

(51) Int. Cl.[7] .............................................. G06K 7/14
(52) U.S. Cl. ................... 235/454; 235/462.41
(58) Field of Search ................ 235/462.13, 454, 235/462.41, 462.42

(56) References Cited

U.S. PATENT DOCUMENTS

| 4,672,412 A | * | 6/1987 | Wei et al. ............... 257/448 |
| 5,844,598 A | * | 12/1998 | Janesick .................. 348/79 |
| 6,535,247 B1 | * | 3/2003 | Kozlowski et al. ....... 348/241 |

* cited by examiner

*Primary Examiner*—Karl D. Frech
(74) *Attorney, Agent, or Firm*—William B. Kempler; W. James Brady, III; Frederick J. Telecky, Jr.

(57) ABSTRACT

The pixels of an image sensor array can be readout (84, 85) in m×n blocks (m, n) that are compatible with the operation of a desired image compression algorithm (14), thereby reducing the amount of memory required by the image compression algorithm.

25 Claims, 5 Drawing Sheets

IMAGE SENSOR ARRAY READOUT FOR SIMPLIFIED IMAGE COMPRESSION

FIELD OF THE INVENTION

The invention relates generally to image processing and, more particularly, to the control of image sensor arrays.

BACKGROUND OF THE INVENTION

The success of 2D sensor development has permitted relatively high levels of integration, so that several blocks, such as timing control, PGA and ADC can be provided together with a 2D sensor array (for example a CMOS array) on a single integrated circuit chip. A conventional example of such a single chip imager 10 is illustrated in the conventional system diagram of FIG. 1.

As the use of digital cameras, video conferencing and digital video has increased, a corresponding increase in the need for image compression has arisen. FIG. 1 illustrates conventional components of an imaging compression architecture, including an image processing chip 13 which includes a compression engine 14, and a suitable memory chip 15. A multi-chip architecture such as shown in FIG. 1 has several disadvantages, including the expense of the individual chips, the space requirements of the individual chips, and the total power consumption of the multi-chip architecture. These factors can vary with the size and complexity of the individual chips. For example, as the size and/or pixel resolution of the sensor array 12 within the imager 10 increases, the size of the memory chip 15 also increases.

Many conventional image compression algorithms process pixel elements in 8×8 blocks. Using a Discrete Cosine Transform (DCT), wherein each 8×8 block includes 8 row pixel elements and 8 column pixel elements. In conventional image processing arrangements, the image is read out in rows of pixels starting from the top (or bottom) of the sensor array and working down (or up). This requires the compression engine to store 8 complete rows of pixel data before it can actually begin compression operations. Moreover, because the image compression operations would, in general, be performed concurrently with the process of reading pixels from the sensor, the compression engine would normally read out the next 8 rows of pixel data while compressing blocks from the previous 8 rows. Thus, for real time compression in this example, the memory of FIG. 1 must be adequately sized to store 16 complete rows of pixels. Many conventionally available sensor arrays can include more than 3 million pixels, with over 2,000 pixels per row. Assuming a resolution of 8 bits/pixel, more than 16×2000=32,000 bytes of memory would be needed to permit the compression engine to operate in real time.

FIG. 2 illustrates a conventional example of a 2D CMOS sensor array. In the pixel detail of FIG. 2, R_SW designates a row reset switch, and S_SW designates a row select switch. The row reset switches of the pixels of a single pixel row are connected together by metal lines, as are the row select switches of the row, such that both the row reset switches and the row select switches can be controlled by suitable control signals produced for that row by a row decoder. Examples of these control signals are shown in FIGS. 3 and 4. As shown therein, the pixels of each row receive a common row reset signal Row_r(i) and a common row select signal Row_s(i). The row reset signal for a given row controls the row reset switches of the pixels of that row, and the row select signal for a given row controls the row select switches of the pixels of that row. FIGS. 3 and 4 also illustrate conventional column readout lines, designated as Col_s(m) and Col_s(n). These column readout lines are driven by the pixel elements during column readout.

It is desirable in view of the foregoing to provide for image compression without the aforementioned cost, space and power consumption disadvantages associated with conventional image compression arrangements.

The present invention provides readout control signals that permit the pixels of an image sensor array to be read out in blocks that are compatible with the operation of a desired image compression algorithm. This reduces the amount of memory required by the image compression algorithm, thereby advantageously permitting a more highly integrated image compression system with correspondingly reduced cost, space and power consumption requirements.

DETAILED DESCRIPTION

In the following discussion, a monochrome sensor with a dynamic range of 8 bits per pixel is assumed for clarity of exposition. However, it will be evident to workers in the art that the exemplary image compression system architecture described below is readily applicable to monochrome or color sensors, with higher or lower dynamic ranges.

Figure 1:
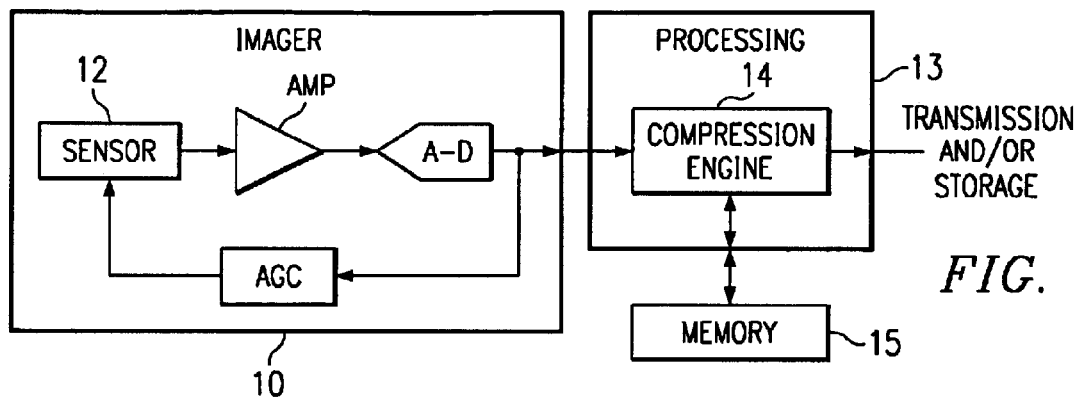
FIG. 1 illustrates an example of a conventional image compression system architecture.
Figure 2:
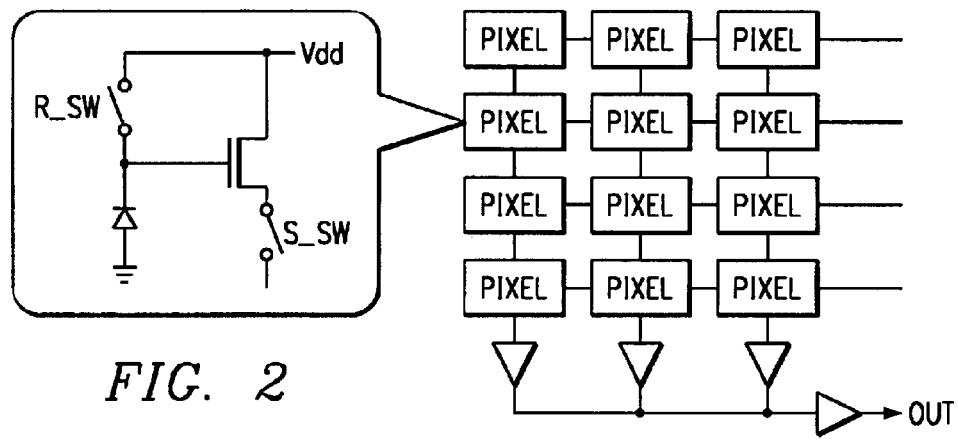
FIGS. 2–4 illustrate details of the sensor array of FIG. 1.
Figure 3:
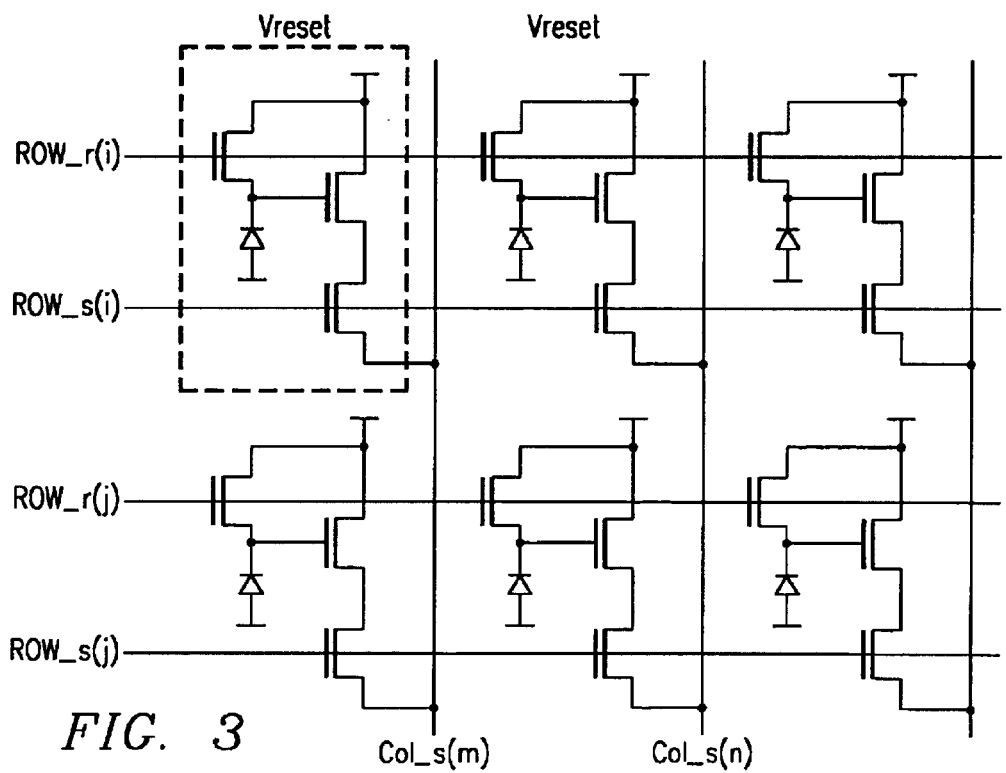
Figure 4:
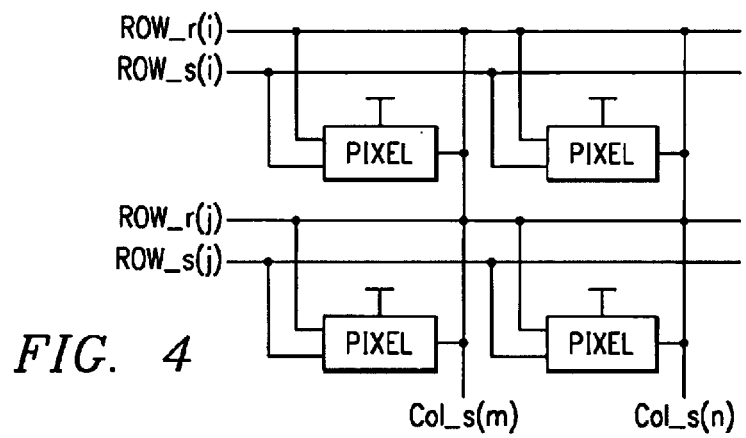
Figure 5A:
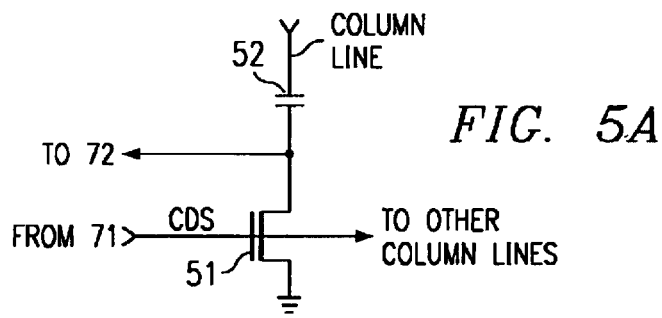
FIG. 5A illustrates in detail a portion of the column lines of FIG. 5.
Figure 5:
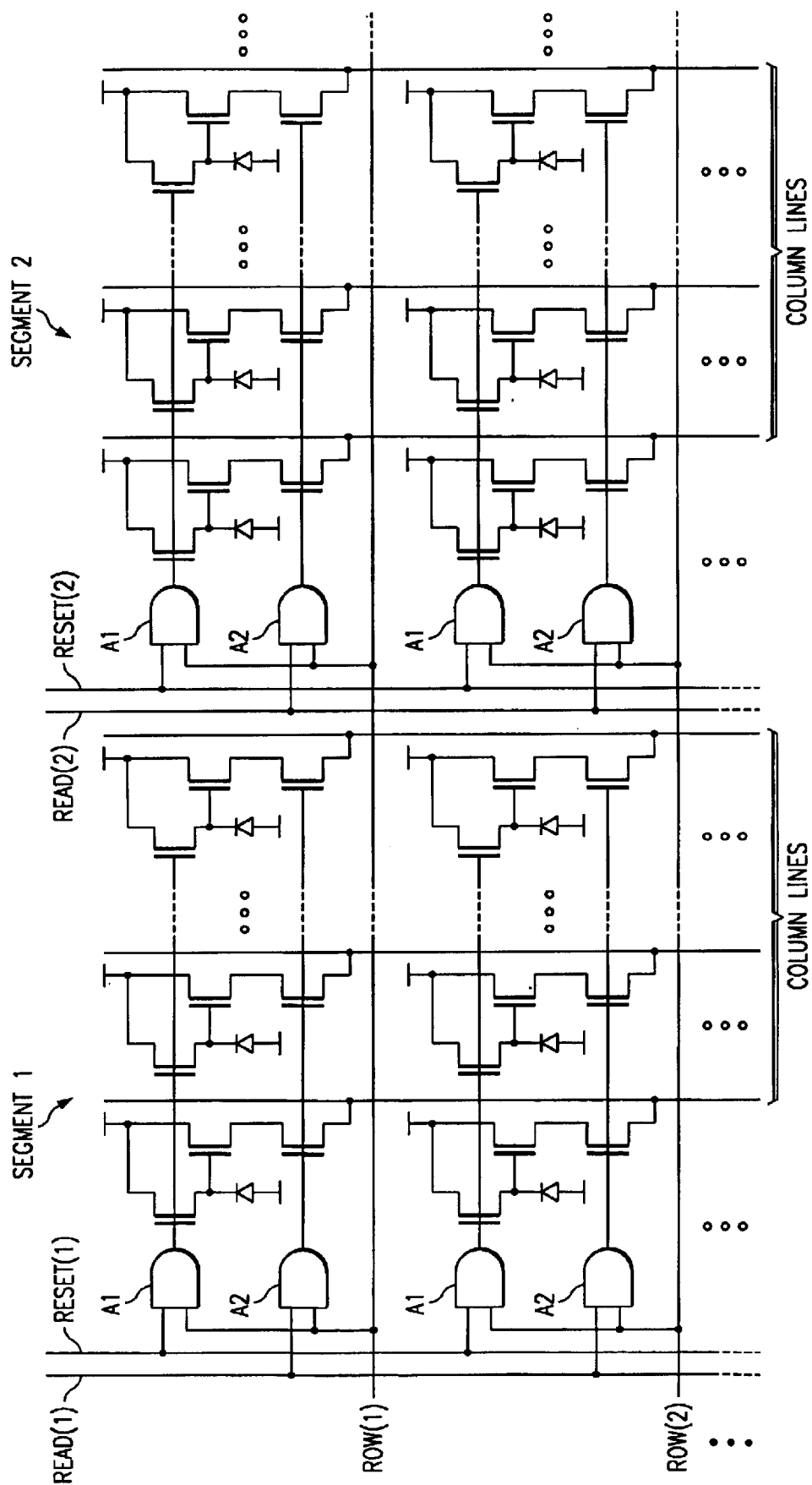
FIG. 5 illustrates pertinent portions of exemplary embodiments of an image sensor array according to the invention.

FIG. 5 illustrates pertinent portions of exemplary embodiments of an image sensor array according to the invention. In the array of FIG. 5, each row of pixels is segmented into a plurality of segments, for example segment 1 and segment 2 of FIG. 5. The row select and row enable signals for the pixels of each segment are driven by control logic associated with that segment. In FIG. 5, the control logic for each segment includes a pair of two input AND gates designated generally as A1 and A2. For each segment, the output of the associated gate A1 drives the row reset signal for the pixels of that segment, and the output of the gate A2 drives the row select signal for the pixels of that segment. One input of each of the gates A1 and A2 is driven by the associated row enable signal. For example, each of the gates A1 and A2 of segment 1 and segment 2 of row 1 have one input driven by the row 1 enable signal, namely Row(1). The gates A1 and A2 associated with the segments of row 2 similarly have one input driven by the row 2 enable signal, namely Row(2), and so on.

The gates A1 of segment 1 of each row are also driven by a reset signal associated with segment 1, namely Reset(1). Similarly, the gates A2 of segment 1 of each row are driven by a read signal associated with segment 1, namely Read(1). Reset and read signals Reset(2) and Read(2) associated with segment 2 of each row are similarly applied to the respective gates A1 and A2 of segment 2 of each row, and so on.

It can therefore be seen that the gates A1 and A2 of each individual segment permit that segment to be individually reset and read out on the associated column lines, without affecting any other segment in the array. Therefore, by suitably controlling the read, reset and row enable signals of FIG. 5, pixel blocks of a desired size can be directly accessed and read out from the array via the column lines.

Figure 6:
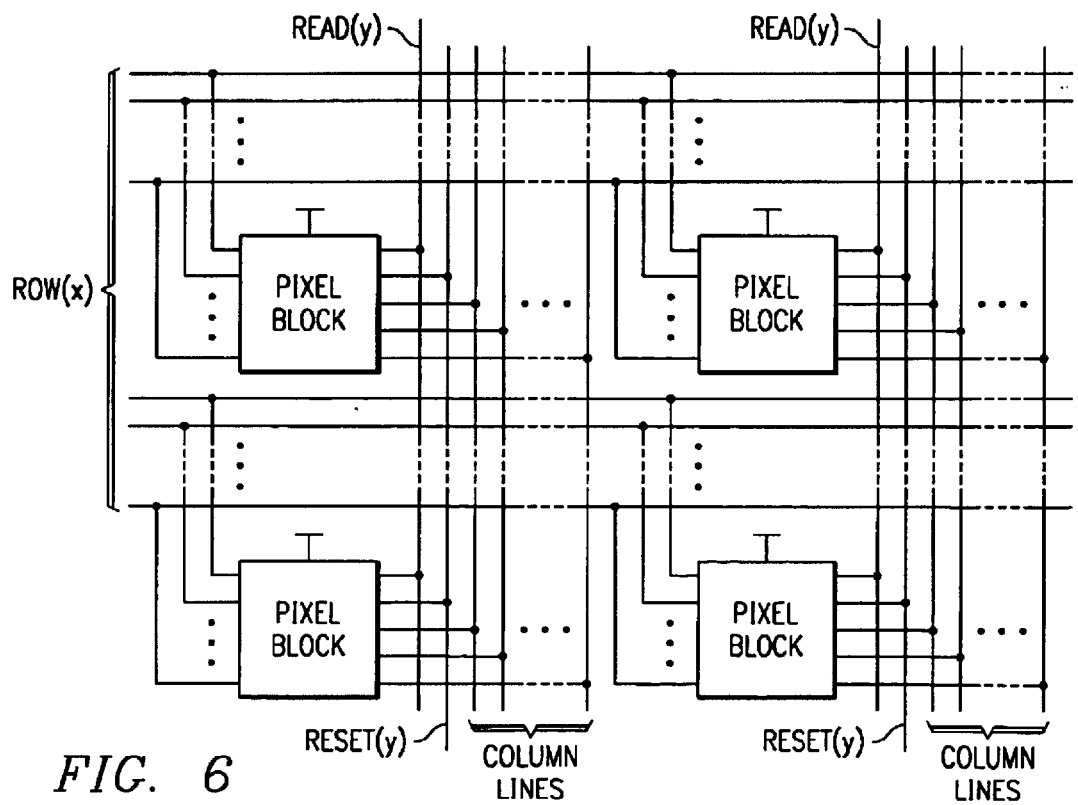
FIG. 6 illustrates the embodiments of FIG. 5 on a pixel block level.

FIG. 6 illustrates exemplary pixel blocks which can be accessed using the control signaling scheme of FIG. 5. The row enable signals of FIG. 6 are designated as Row(x), where x can range from 1 through r, where r is the number of rows in the sensor array. The reset and read signals of FIG. 6 are designated Reset(y) and Read(y), where y can range from 1 through s, where s is the number of segments in each row of the array. The size of the pixel blocks is determined by the segment size and the number of rows in each pixel block. A pixel block of size m×n would include a given n-pixel segment (e.g. segment 1) in each of m rows.

Figure 7:
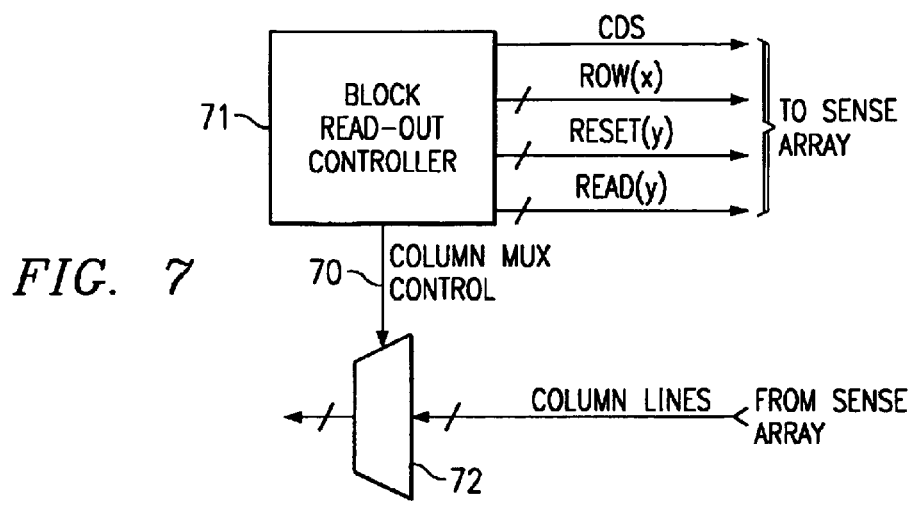
FIG. 7 diagrammatically illustrates exemplary embodiments of a block readout controller according to the invention for providing the control signals of FIGS. 5 and 6.

FIG. 7 diagrammatically illustrates exemplary embodiments of a block readout controller which provides the row enable, reset and read signals of FIGS. 5 and 6, and which also provides a correlated double sampling (CDS) signal, and suitable column multiplexing control 70 to permit the desired block readout via column multiplexer 72. The operation of the block readout controller 71 of FIG. 7 is best understood with reference to the flow diagram of FIG. 8.

Figure 8:
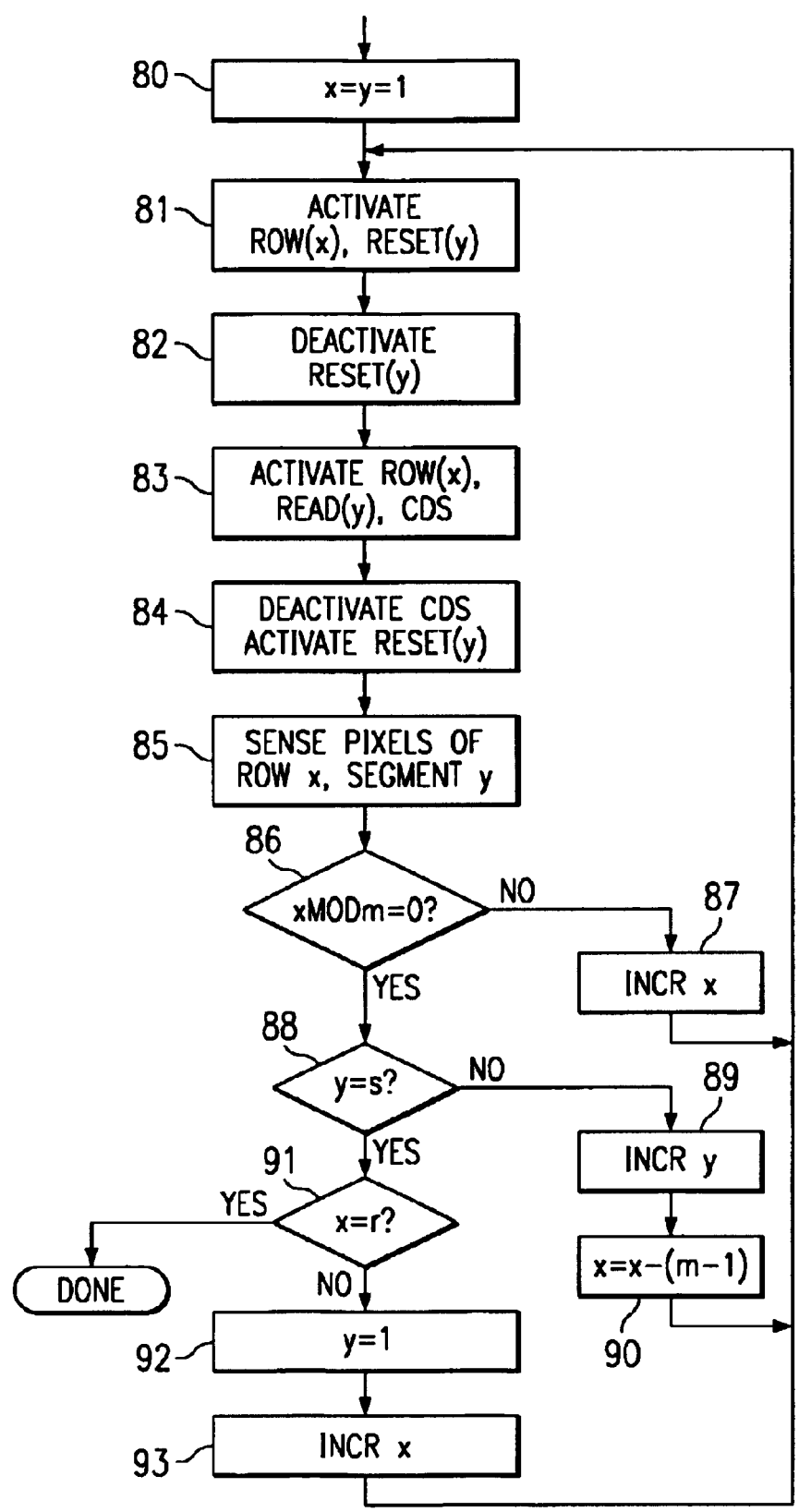
FIG. 8 illustrates exemplary operations which can be performed by the embodiments of FIGS. 5–7.

The example of FIG. 8 assumes s segments of n pixels in each row of an array of r rows. At 80, a row index x and a segment index y are each initialized to a value of 1. At 81, the signals Row(x) and Reset(y) are activated in order to charge the photodiodes of segment y of row x. At 82, the signal Reset(y) is deactivated in order to begin the exposure time. At 83, the signals Row(x), Read(y) and CDS are activated so the pixels of the current segment can drive the associated column lines and charge the associated CDS capacitors (see 52 in FIG. 5A). At 84, the signal CDS is deactivated, and the signal Reset(y) is activated, thereby performing the correlated double sampling (CDS) operation (see also 51 in FIG. 5A).

At 85, the controller 71 outputs appropriate column multiplexer control (see 70 in FIG. 7) to sense the n pixels of segment y of row x. Thereafter at 86, it is determined whether or not the row index x has reached a multiple of m. If not, then the row index x is incremented at 87, and operations return to 81. On the other hand, if the row index x is determined at 86 to be a multiple of m, then it is determined at 88 whether the segment index y is equal to s. If not, then the segment index y is incremented at 89, and the row index x is reset to a value of x−(m−1) at 90. Operations thereafter return to 81. On the other hand, if the segment index y is equal to s at 81, it is determined at 91 whether the row index x is equal to r. If so, operations are completed. If not, then the segment index y is reset to a value of 1 at 92, and the row index x is incremented at 93, after which operations return to 81.

Although the example of FIG. 8 reads out m×n blocks moving across the columns of the first m rows of the array and thereafter the next m rows of the array, and so on, the block readout controller 71 of FIG. 7 can be designed to provide m×n block readout in any desired order of m×n blocks.

Figure 9:
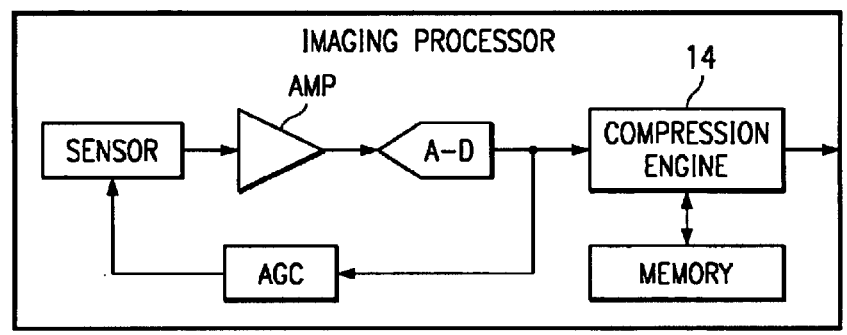
FIG. 9 illustrates an exemplary embodiment of an integrated image compression system architecture according to the invention.

Due to the block readout capability provided by the sensor array structure of FIGS. 5–7, and assuming a monochrome system with a resolution of 8 bits per pixel, an image compression system architecture according to the invention requires only 2×m×n bytes of memory for an m×n block-based compression algorithm such as DCT. Thus, when processing 8×8 blocks, the invention requires only 128 bytes of memory, as compared to the 32,000 bytes of memory required in the aforementioned conventional example. This reduced memory size permits all of the components of an image compression system to be integrated onto a single integrated circuit chip, as illustrated generally in FIG. 9.

Figure 10:
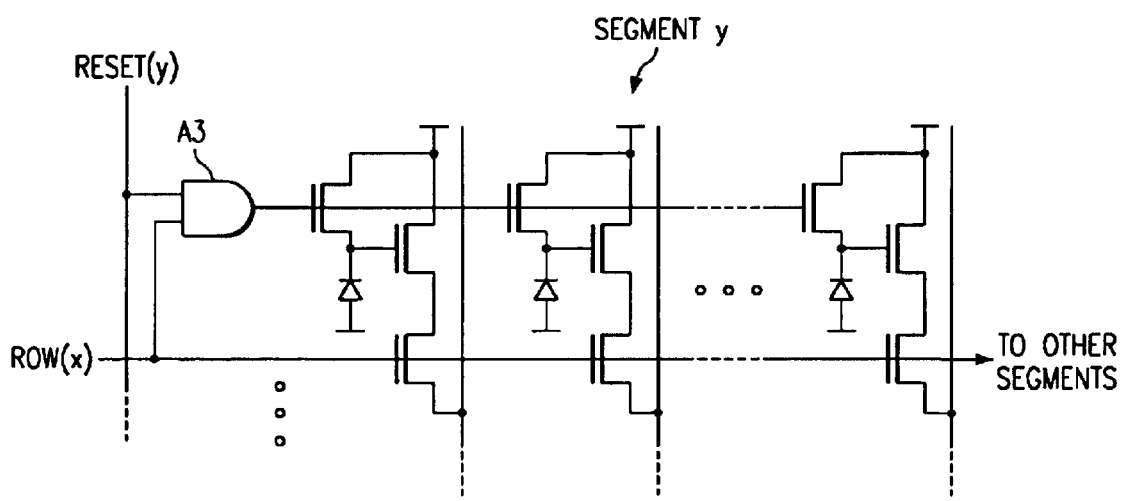
FIG. 10 illustrates pertinent portions of further exemplary embodiments of an image sensor array according to the invention.

FIG. 10 illustrates pertinent portions of another exemplary embodiment of an image sensor array according to the invention. The row segment illustrated in FIG. 10 has a segment reset signal driven by AND gate A3. An image sensor array having this structure can be controlled in generally the same fashion as illustrated in FIG. 8, except there is no Read(y) signal to be activated at 83. The image sensor array embodiment of FIG. 10 also permits the above-described reduction in the memory requirement for the compression engine, and therefore enables the single chip integration described above with respect to FIG. 9.

Although exemplary embodiments of the invention are described above in detail, this does not limit the scope of the invention, which can be practiced in a variety of embodiments.

What is claimed is:

1. An image sensor array apparatus, comprising:
   a plurality of rows of pixel circuits, each said row including a plurality of electrically separate segments having therein a plurality of said pixel circuits;
   a plurality of column lines for readout of image information sensed by said pixel circuits, said pixel circuits of each said row respectively coupled to said column lines; and
   a plurality of control circuits, each of said control circuits respectively being D.C. coupled to one of said segments of pixel circuits, each said control circuit for resetting the pixel circuits of the corresponding segment without resetting the pixel circuits of all of the remaining segments of the corresponding row.

2. The apparatus of claim 1, wherein each of said control circuits is further operable for permitting the pixel circuits of the corresponding segment to drive their associated column lines without requiring the pixel circuits of all of the remaining segments of the corresponding row to drive their associated column lines.

3. The apparatus of claim 2, wherein each of said pixel circuits includes first and second control inputs, each of said control circuits coupled to said first and second control inputs of the pixel circuits of the corresponding segment.

4. The apparatus of claim 3, wherein said first control input is a reset input which resets said pixel circuit, and wherein said second control input is a readout input which causes said pixel circuit to drive its associated column line.

5. The apparatus of claim 4, wherein each of said control circuits includes first and second logic gates having respective outputs which are respectively coupled to said reset and readout inputs of the pixel circuits of the corresponding segment.

6. The apparatus of claim 3, wherein each of said control circuits includes first and second logic gates having respective outputs which are respectively coupled to said first and second control inputs of the pixel circuits of the corresponding segment.

7. The apparatus of claim 6, wherein said first and second logic gates are AND gates.

8. The apparatus of claim 2, wherein each of said control circuits is further operable for reselling the pixel circuits of the corresponding segment without resetting the pixel circuits of any of the remaining segments of the corresponding row.

9. The apparatus of claim 8, wherein each of said control circuits is further operable for permitting the pixel circuits of the corresponding segment to drive their associated column lines without requiring the pixel circuits of any of the remaining segments of the corresponding row to drive their associated column lines.

10. The apparatus of claim 2, wherein each of said control circuits is further operable for permitting the pixel circuits of the corresponding segment to drive their associated column lines without requiring the pixel circuits of any of the remaining segments of the corresponding row to drive their associated column lines.

11. The apparatus of claim 1, wherein each of said pixel circuits includes a control input, each of said control circuits coupled to said control input of the pixel circuits of the corresponding segment.

12. The apparatus of claim 11, wherein said control input is a reset input which resets said pixel circuit.

13. The apparatus of claim 12, wherein each of said control circuits includes a logic gate having an output which is coupled to said reset input of the pixel circuits of the corresponding segment.

14. The apparatus of claim 11, wherein each of said control circuits includes a logic gate having an output which is coupled to said control input of the pixel circuits of the corresponding segment.

15. The apparatus of claim 14, wherein said logic gate is an AND gate.

16. The apparatus of claim 1, wherein each of said control circuits is further operable for resetting the pixel circuits of the corresponding segment without resetting the pixel circuits of any of the remaining segments of the corresponding row.

17. The apparatus of claim 1, provided as a CMOS image sensor array.

18. The apparatus of claim 1, provided on a single integrated circuit together with a compression engine coupled thereto and a memory circuit coupled to said compression engine.

19. A method of controlling an image sensor array having a plurality of rows of pixel circuits and a plurality of column lines for readout of image information sensed by the pixel circuits, comprising:

identifying within a row a plurality of electrically separate segments having therein a plurality of pixel circuits; and resetting the pixel circuits of a desired segment via D.C. coupled signals without reselling the pixel circuits of all of the remaining segments of the row.

20. The method of claim 19, including the pixel circuits of the desired segment driving their associated column lines without the pixel circuits of all of the remaining segments of the row driving their associated column lines.

21. The method of claim 20, wherein said resetting step includes resetting the pixel circuits of the desired segment without resetting the pixel circuits of any of the remaining segments of the row.

22. The method of claim 21, wherein said driving step includes the pixel circuits of the desired segment driving their associated column lines without the pixel circuits of any of the remaining segments of the row driving their associated column lines.

23. The method of claim 20, wherein said driving step includes the pixel circuits of the desired segment driving their associated column lines without the pixel circuits of any of the remaining segments of the row driving their associated column lines.

24. The method of claim 19, wherein said reselling step includes resetting the pixel circuits of the desired segment without resetting the pixel circuits of any of the remaining segments of the row.

25. The method of claim 19, including resetting an m×n block of the pixel circuits without resetting any of the remaining pixel circuits, including resetting the pixel circuits of m segments which have n-pixels each and which are respectively located at corresponding locations in m rows of the array.

* * * * *